United States Patent
Chung (10) Patent No.: US 11,304,783 B2
(45) Date of Patent: Apr. 19, 2022

(54) BREAKABLE COUPLING TYPE DENTAL IMPLANT PACKAGING CONTAINER

(71) Applicant: POINTNIX CO., LTD., Seoul (KR)

(72) Inventor: Joa Rak Chung, Seoul (KR)

(73) Assignee: POINTNIX CO., LTD., Seoul (KR)

( * ) Notice: Subject to any disclaimer, the term of this patent is extended or adjusted under 35 U.S.C. 154(b) by 304 days.

(21) Appl. No.: 16/563,929

(22) Filed: Sep. 9, 2019

(65) Prior Publication Data

US 2020/0000559 A1 Jan. 2, 2020

Related U.S. Application Data

(63) Continuation of application No. PCT/KR2018/002746, filed on Mar. 8, 2018.

(30) Foreign Application Priority Data

Mar. 10, 2017 (KR) .......................... 10-2017-0030820
Feb. 6, 2018 (KR) .......................... 10-2018-0014481

(51) Int. Cl.
*A61C 19/02* (2006.01)
*A61C 8/00* (2006.01)

(52) U.S. Cl.
CPC .................................. *A61C 8/0087* (2013.01)

(58) Field of Classification Search
CPC . A61B 17/865; A61B 17/8872; A61B 19/026; A61B 19/0256; A61B 2019/0206; A61B 2019/0213; A61C 8/0087; A61C 19/02
USPC ................. 206/63.5, 368, 369; 433/141, 173
See application file for complete search history.

(56) References Cited

U.S. PATENT DOCUMENTS

| | | | | |
|---|---|---|---|---|
| 5,538,428 A | * | 7/1996 | Staubli ................. | A61C 8/0087 206/63.5 |
| 5,558,230 A | * | 9/1996 | Fischer ................ | A61C 8/0087 206/570 |
| 5,622,500 A | * | 4/1997 | Niznick ............... | A61C 8/0048 206/63.5 |
| 5,692,904 A | * | 12/1997 | Beaty ................... | A61C 8/0087 433/141 |

(Continued)

FOREIGN PATENT DOCUMENTS

JP 2002520084 A 7/2002
KR 200303351 Y1 2/2003
(Continued)

OTHER PUBLICATIONS

International Search Report dated Jun. 28, 2018 for PCT/KR2018/002746.

(Continued)

*Primary Examiner* — Luan K Bui
(74) *Attorney, Agent, or Firm* — Cantor Colburn LLP (57) ABSTRACT

An embodiment of the present invention provides a dental implant packaging container comprising: an implant fixing unit to which an implant can be detachably coupled; a sealing cap including the implant fixing unit; and a casing, wherein: the sealing cap and the casing form an inner space together; the casing has a hollow cylindrical shape and is partially opened; the inner space is formed by coupling the sealing cap to the opened portion of the casing; and the implant is "breakably coupled" to the implant fixing unit.

10 Claims, 11 Drawing Sheets

(56) References Cited

U.S. PATENT DOCUMENTS

| | | | |
|---|---|---|---|
| 6,217,332 B1* | 4/2001 | Kumar | A61C 8/0087 |
| | | | 206/368 |
| 6,247,932 B1* | 6/2001 | Sutter | A61C 8/0087 |
| | | | 206/368 |
| 6,315,562 B1 | 11/2001 | Kumar | |
| 2005/0258130 A1* | 11/2005 | Fallaha | B65D 23/065 |
| | | | 215/246 |
| 2013/0000262 A1 | 1/2013 | Richart | |
| 2017/0095308 A1* | 4/2017 | Roesler | A61C 8/0087 |

FOREIGN PATENT DOCUMENTS

| | | |
|---|---|---|
| KR | 100759260 B1 | 9/2007 |
| KR | 200441072 Y1 | 7/2008 |
| KR | 2020110008520 U | 9/2011 |
| KR | 101394116 B1 | 5/2014 |
| KR | 1020140059044 A | 5/2014 |

OTHER PUBLICATIONS

Korean Office Action for Application No. 10-2017-0035294 dated Sep. 11, 2018.
Korean Office Action for Application No. 20-2017-0001319 dated Sep. 14, 2018.

* cited by examiner

FIG. 11

BREAKABLE COUPLING TYPE DENTAL IMPLANT PACKAGING CONTAINER

TECHNICAL FIELD

The present disclosure relates to a breakable coupling type dental implant packaging container.

BACKGROUND ART

As is well known, an implant fixture (hereinafter, referred to as an "implant" or an "implant fixture") is implanted into the upper or lower jawbone of the mouth, and is normally put into separate packaging and is stored therein to be kept sterile before it is implanted into the upper or lower jawbone. A variety of packaging for packaging and storing such an implant fixture therein has been developed, and is being distributed and used in the market.

For example, Korean Registered Utility Model Publication No. 20-0303351, Korean Registered Utility Model Publication No. 20-0441072, and Korean Laid-Open Patent Publication No. 2014-0059044 disclose packaging for an implant fixture.

The implant fixture may undergo ultraviolet treatment and may be modified to have superhydrophilicity in order to increase biological activity before it is put into packaging. However, when a certain time is elapsed, the superhydrophilicity may be reduced and thus the implant fixture should be drawn out from the packaging and should undergo the treatment again to obtain the superhydrophilicity. During this process, the implant fixture may come into contact with the air. Therefore, there is a high probability that the implant fixture is contaminated. Accordingly, related-art implant fixtures are difficult to store for a long time, and should be used as soon as possible after they are released from factories.

DETAILED DESCRIPTION OF THE PRESENT DISCLOSURE

Technical Objects

According to an embodiment of the present disclosure, there is a provided a dental implant packaging container which can store an implant for a long time without contaminating it.

According to an embodiment of the present disclosure, there is provided a dental implant packaging container which can allow an implant to be implanted without contaminating it from hand.

According to an embodiment of the present disclosure, there is provided a dental implant packaging container which can maintain hydrophilicity of an implant to increase biological activity of the implant, and is configured to have hydrophile treatment easily performed.

Technical Solving Means

According to an embodiment of the present disclosure, a dental implant packaging container includes:
an implant fixing part to which an implant is detachably coupled;
a sealing cap including the implant fixing part; and
a casing, and
the sealing cap and the casing are coupled to each other to form an inner space,
the casing has a containerlike shape (for example, a cylindrical shape) having a hollow formed therein, and has a portion opened,
the opened portion of the casing and the sealing cap are coupled to each other to form the inner space, and
the implant and the implant fixing part are coupled to each other in a "breakable coupling" method.

Advantageous Effects

According to one or more embodiments of the present disclosure, an implant is positioned in a sealed space before it is used, and thus is not contaminated.

According to one or more embodiments of the present disclosure, an implant can be implanted without contacting with hands.

According to one or more embodiments of the present disclosure, since hydrophile treatment (for example, ultraviolet treatment) can be performed on an implant positioned in a sealed space, convenience can be enhanced and there is no risk that the implant is contaminated.

According to one or more embodiments of the present disclosure, elements exposed to ultraviolet rays along with an implant are coated or configured with a material that does not generate particles degrading hydrophilicity. Therefore, the hydrophilicity of the implant is not degraded and can be maintained even after ultraviolet treatment.

According to one or more embodiments of the present disclosure, ultraviolet rays (UV) that do not change a unique physical shape of a surface of an implant are irradiated, and a hydrophilic surface of the implant is modified to have superhydrophilicity, and the implant can be stored to maintain the superhydrophilicity of the modified surface for a long time. The implant modified and stored as described above has an enhanced affinity with body fluid and blood on the surface, and can achieve the effects of excellent initial bone formation and a reduced bone integration period after an implant procedure.

| [Explanation of Signs] | |
|---|---|
| 113: implant | 111: casing |
| 115: mount | 180: sealing cap |
| 161: implant fixing part | 162: insertion part |
| 163: connection part | 164: base part |
| 146: tape | |

BEST MODE FOR EMBODYING THE INVENTION

Exemplary embodiments will now be described more fully with reference to the accompanying drawings to clarify objects, other objects, features and advantages of the present disclosure. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

The exemplary embodiments include their complementary embodiments. As used herein, the singular forms are intended to include the plural forms as well, unless the context clearly indicates otherwise. It will be further understood that the terms "comprise" and/or "comprising," when used in this specification, do not preclude the presence or addition of one or more other components.

Figure 1:
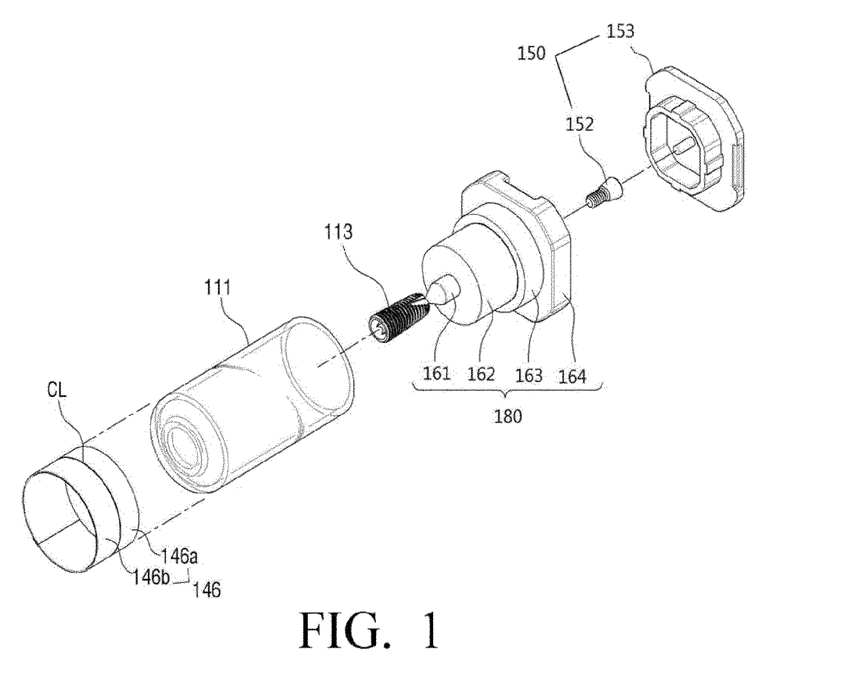
FIGS. 1 and 2 are an exploded perspective view and a transparent perspective view of a dental implant packaging container, respectively, according to an embodiment of the present disclosure.
Figure 2:
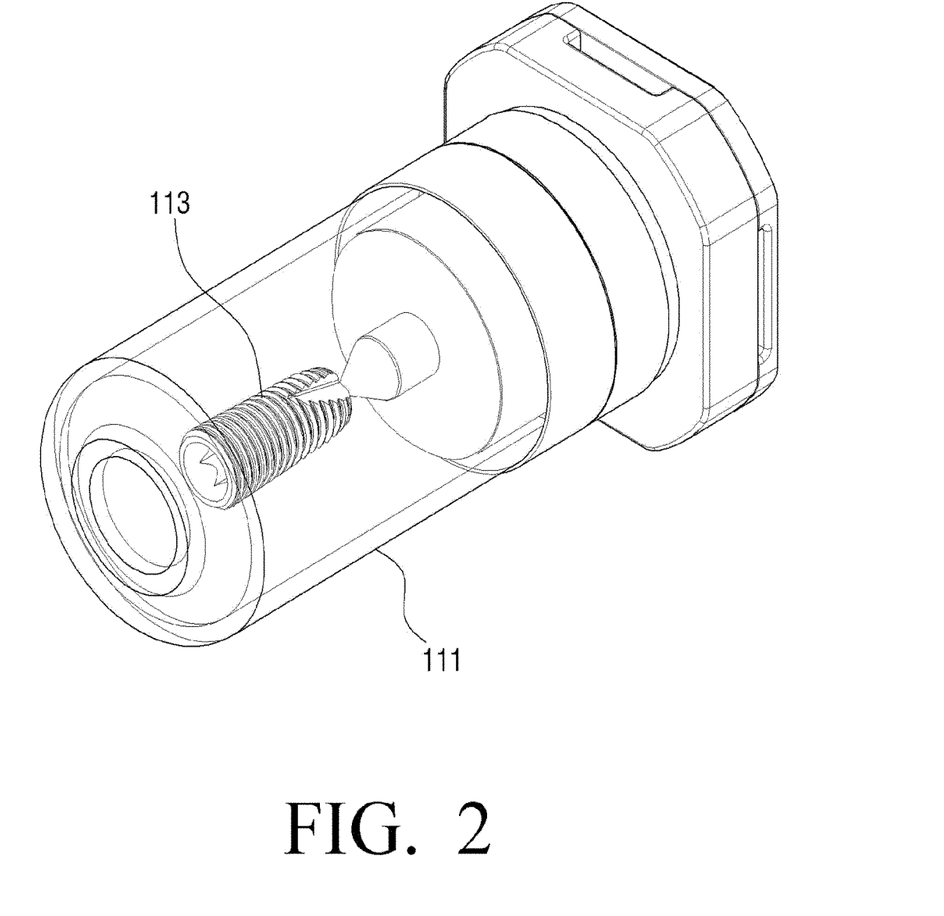

FIGS. 1 and 2 are an exploded perspective view and a transparent perspective view of a dental implant packaging container, respectively, according to an embodiment of the present disclosure.

Referring to these drawings, the dental implant packaging container according to an embodiment of the present disclosure includes a casing 111, an implant 113, and a sealing cap 180.

The sealing cap 180 and the implant 113 are coupled to each other.

In the present embodiment, the sealing cap 180 and the implant 113 are coupled to each other in a "breakable coupling" method.

In the description of the present application, the term "breakable coupling" refers to coupling that is maintained when there is no physical external force, but is easily broken when there is a physical external force intended by a person. The "breakable coupling" will be additionally described below.

The casing 111 and the sealing cap 180 are coupled to each other to form a sealed space. Herein, the casing 111 is formed with a material allowing ultraviolet rays to pass therethrough. For example, the casing 111 may be formed with a material like quartz.

According to the present embodiment, the dental implant packaging container may further include a sealing cap cover 153.

In the present embodiment, the sealing cap cover 153 is coupled to the sealing cap 180, and provides a space to have an implant cover screw 152 embedded therein. The implant cover screw 152 is an element that is coupled to an upper portion of the implant 113 to prevent contamination of the implant 13 after the implant 113 is implanted into gums.

In the present embodiment, the casing 111 has a containerlike shape having a hollow formed therein, and has one end closed and the other end opened. The opened end of the casing 111 is coupled with the sealing cap 180. For the purpose of explanation, the closed end of the casing 111 will be referred to as a lower portion, and the opened end will be referred to as an upper portion.

In the present embodiment, the implant 113 is positioned in an inner space formed by coupling the casing 111 and the sealing cap 180. In the detailed description of the present application, the space formed by coupling the casing 111 and the sealing cap 180 to prevent air from flowing from the outside will be referred to as a "sealed space" or "inner space."

In the present embodiment, the sealing cap 180 includes an implant fixing part 161, an insertion part 162 to be inserted into the casing 111, a connection part 163, and a base part 164.

One end of the implant fixing part 161 and the implant 113 are coupled to each other in the "breakable coupling" method, and the other end of the implant fixing part 161 is coupled to the insertion part 162.

The insertion part 162 may have a shape and a size to be inserted into the casing 111, and, for example, may have a containerlike shape.

Figure 3:
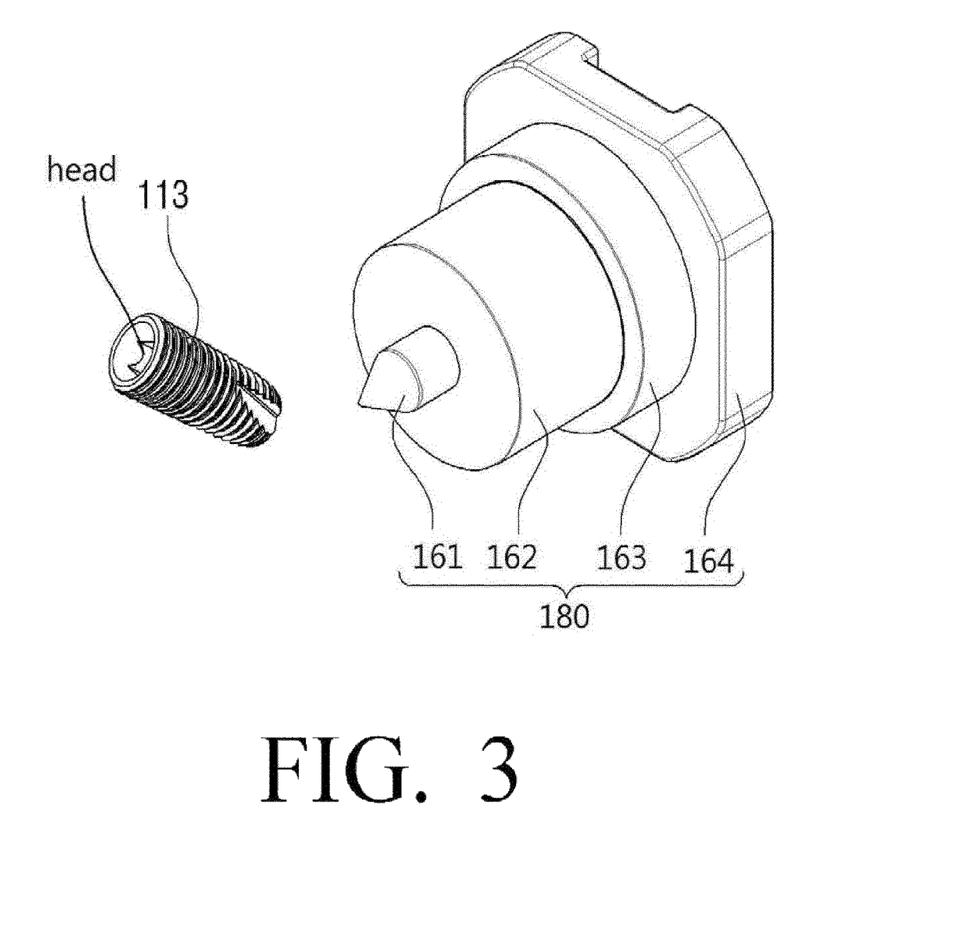
FIG. 3 is a view to explain a method for using the dental implant packaging container according to an embodiment of the present disclosure.

FIG. 3 is a view to explain breakable coupling in the dental implant packaging container according to an embodiment of the present disclosure.

As can be seen from FIG. 3, the implant 113 and the implant fixing part 161 may be coupled to each other in the "breakable coupling" method, and accordingly, both parts 113, 161 can be easily decoupled from each other by a physical force of a user.

According to an embodiment, portions of the implant fixing part 161 and the implant 113 which are coupled to each other are formed with a material and in a shape and a size, such that the portions can be easily broken when receiving a person's physical force.

According to the present embodiment, the implant fixing part 161 may be formed in a conical shape, and a vertex of the cone is coupled with the implant 113 in the "breakable coupling" method.

When a user holds a driver (not shown) with one hand and inserts the driver into a head of the implant 113, and holds the base part 164 of the sealing cap 180 with the other hand, and applies force to one hand or both hands to twist the implant 113 and the implant fixing part 161 in the opposite directions, the implant 113 can be easily decoupled from the implant fixing part 161 as shown in FIG. 3 by way of an example.

The insertion part 162 may be formed in a containerlike shape, and one side surface of the containerlike shape may be connected with the base part 164 through the connection part 163, and the other side surface of the containerlike shape may be inserted into the casing 111 and detachably coupled thereto.

The insertion part 162 and the casing 111 are coupled to each other to prevent air from flowing into the inner space.

According to the present embodiment, the upper portion of the casing 111 and the sealing cap 180 face in contact with each other, and a tape 146 (146a, 146b) is attached to the contacting portions. That is, the connection part 163 of the sealing cap 180 and the opened end of the casing 111 may face in contact with each other, and the tape 146 (146a, 146b) is attached to the contacting portions, such that the inner space is sealed to prevent air from flowing thereinto. Of course, the tape 146 (146a, 146b) may be formed with a material that can be torn, and, when the tape is torn, the casing 111 and the sealing cap 180 can be easily decoupled from each other.

A method of tearing the tape 146 (146a, 146b) may be performed by holding the casing 111 with one hand and holding the base part 164 of the sealing cap 180 with the other hand, and then rotating in the opposite directions, and in this method, the portion where the upper portion of the casing 111 and the sealing cap 180 are in contact with each other can be easily torn.

Figure 4:
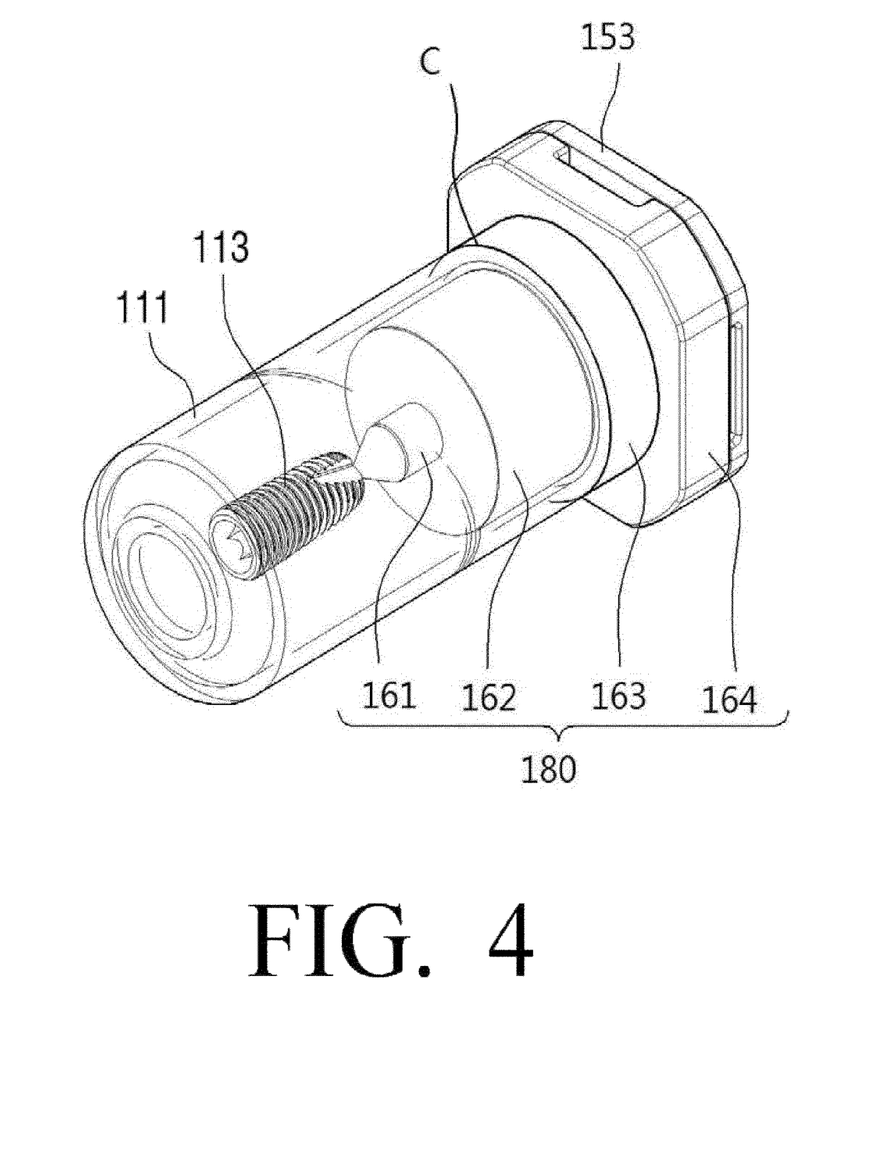
FIG. 4 is a view illustrating a state in which an aluminum tape is removed in the embodiment of FIG. 2.
Figure 5:
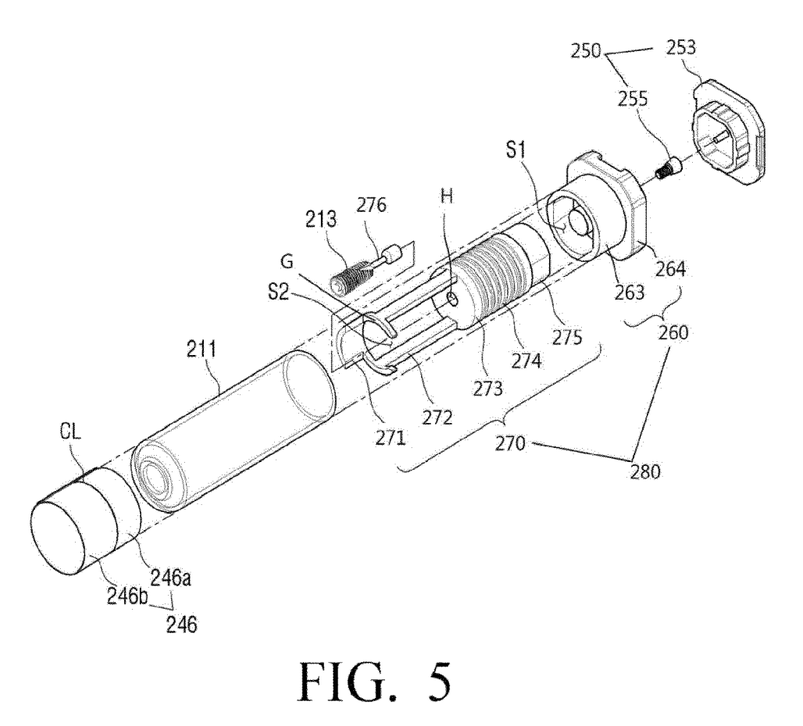
FIGS. 5 to 11 are views to explain a dental implant packaging container according to another embodiment of the present disclosure.
Figure 6:
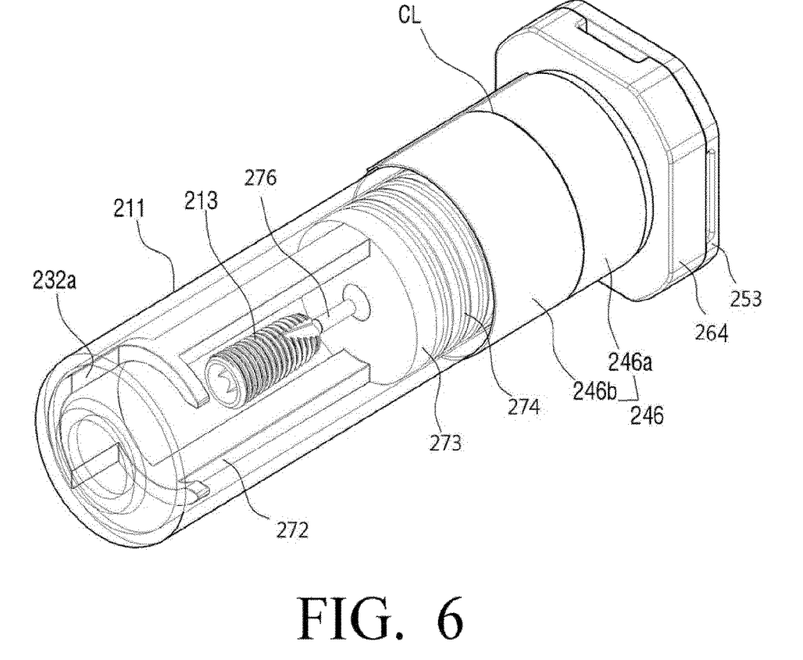

FIG. 4 illustrates a state in which the tape is removed in the embodiment of FIG. 2.

Referring to FIG. 4, the portion C where the casing 111 and the connection part 163 of the sealing cap 180 face in contact with each other is seen, and the tape 146 is attached to cover the contact portion C as described above. The tape 146 has one surface formed with an adhesive material, so that the tape 146 can be easily attached to the contact portion C. The tape 146 is not illustrated in FIG. 4 for the sake of explanation of the contact portion C.

In the present embodiment, the tape 146 (146a, 146b) may be attached by surrounding the exterior of the portion C where the casing 111 and the sealing cap 180 are in contact with each other. This is to maintain the casing 111 and the sealing cap 180 in contact with each other, and to prevent air from flowing into the inner space.

In the present embodiment, the tape 146 (146a, 146b) may be an aluminum tape, but this is merely an example, and other materials may be used.

When the user rotates the casing 111 and the base part 164 of the sealing cap 180 in the opposite directions as described above, the tape 146 (146a, 146b) may be torn.

The casing 111 and the sealing cap 180 may have structures to be easily decoupled from each other in the state in which the tape 146 (146a, 146b) is torn.

An example of the structures to be easily decoupled is structures of the sealing cap 180 and the casing 111 which are easily decoupled from each other by a user pulling the sealing cap 180 and the casing 111 away from each other in the state in which the tape 146 (146a, 146b) is torn. That is, shapes, materials, and sizes of the casing 111 and the insertion part 162 are determined such that the insertion part 162 and the casing 111 are not decoupled from each other when there is no physical force externally applied, and the insertion part 162 and the casing 111 are decoupled from each other only when a physical force is externally applied.

Another example of the structures to be easily decoupled is a structure of the casing 111 which naturally drops down to the ground when the sealing cap 180 is positioned higher than the casing 111 from the ground in the state in which the tape 146 (146a, 146b) is torn. A shape, a material, and a diameter of the inside of the casing 111, and a shape, a material, and a diameter of the insertion part 162 are determined, such that, when the casing 111 is positioned closer to the ground than the sealing cap 180 after the tape 146 (146a, 146b) is torn, the casing 111 naturally drops down due to the gravity.

For example, the insertion part 162 may have a cylindrical shape and may be formed with an inadhesive material, and the inner space of the casing 111 may have a shape to have the cylindrical insertion part 162 inserted thereinto, and a material of the inner surface of the casing 111 may not have adhesiveness. In addition, an inner diameter of the casing 111 may be slightly larger than a diameter of the insertion part 162.

In the detailed description of the present disclosure, the coupling structures that can be decoupled from each other due to the gravity among the structures to be easily decoupled as described above may be referred to as a "gravitationally separable coupling structure."

FIGS. 5, 6, 8, 10, and 11 are views to explain a dental implant packaging container according to another embodiment of the present disclosure.

The embodiment which will be described with reference to the above-mentioned drawings differs from the embodiment described above with reference to FIGS. 1 to 4 in that a sealing cap 280 includes two pieces. Therefore, the difference will be highlighted hereinbelow.

Referring to the above-mentioned drawings, the dental implant packaging container according to another embodiment of the present disclosure includes a casing 211, an implant 213, and a sealing cap 280.

In the present embodiment, the sealing cap 280 includes two pieces. For the purpose of explanation of the present disclosure, one of the two pieces will be referred to as a first piece 260 and the other one will be referred to as a second piece 270.

The first piece 260 and the second piece 270 may have coupling structures which can be easily decoupled from each other. Examples of the coupling structures which can be easily decoupled from each other have been described above with reference to FIGS. 1 to 4.

The sealing cap 280 and the implant 213 may be coupled to each other in the "breakable coupling" method, and specifically, the second piece 270 of the sealing cap 280 and the implant 213 may be coupled to each other in the "breakable coupling" method. More specifically, an implant fixing part 276 of the second piece 270 and the implant 213 may be coupled to each other in the "breakable coupling" method.

In the present embodiment, the first piece 260 includes a connection part 263 and a base part 264, and the second piece 270 includes a guide part 271, 272 and a body part 273, 274, 275.

The guide part 271, 272 has a structure to prevent the implant 213 from contacting the outside, and to allow the implant 213 to be easily decoupled by using a driver (not shown).

For example, the guide part 271, 272 may have an opened area S2 to allow the implant 213 to be easily moved to the outside when the implant 213 is decoupled by using the driver (not shown).

One end of the guide part 271, 272 may be coupled and fixed to the body part 273, 274, 275, and the other end of the guide part 271, 272 may be a free end.

Due to the structure and coupling of the guide part 271, 272 described above, the implant 213 does not contact a floor even when the second piece 270 is placed on the floor at any angle.

This is because the guide part 271, 272 has a structure surrounding the implant 213. For example, the guide part 271, 272 does not completely surround the implant 213, and surrounds except for the opened area S2. As will be described below, the implant 213 coupled by the driver is easily decoupled from the second piece 270 through the opened area S2.

The guide part 271, 272 includes a protrusion plate 271 protruding in a longitudinal direction of the casing 211, and one pair of guide bars 272 surrounding the implant 213.

In the present embodiment, the one pair of guide bars 272 may be coupled to the body part 273, 274, 275, respectively, and may be spaced apart from each other and may face each other with the implant 213 being positioned therebetween.

One end of each of the one pair of guide bars 272 is coupled to the body part 273, 274, 275, and the other end of each of the one pair of guide bars 272 may be connected a semicircular hooking part G The protrusion plate 271 is coupled to the semicircular hooking part G.

As described above, the semicircular hooking parts G and the one pair of guide bars 272 may be arranged and configured to provide the opened space S2, and the driver (not shown) may freely access the implant 213 through the opened space S2.

In the present embodiment, the body part 273, 274, 275 is formed in a containerlike shape.

For easy explanation of the embodiment, the containerlike body part 273, 274, 275 is divided into an upper part 273, a middle part 274, and a lower part 275.

Herein, the upper part 273 may be a part for connecting the guide part 271, 272 and the implant 213, the middle part 274 may be a part that has a shape to be easily gripped by the user, and the lower part 275 may be a part that is detachably coupled with the first piece 260.

The guide part 271, 272 are connected to the upper part 273, and in particular, ends of the one pair of guide bars 272 are coupled to the upper part 273.

The upper part 273 has a hole H formed thereon, and the implant fixing part 276 may be inserted into and positioned in the hole H.

The implant fixing part 276 has a structure to space the implant 213 and the upper part 273 apart from each other by a certain distance. Herein, the certain distance refers to a distance that does not make the implant 213 contact the upper part 272 or does not interrupt decoupling when the implant 213 is decoupled from the implant fixing part 276.

The implant fixing part 276 may have a sticklike shape, for example.

One end of the sticklike implant fixing part 276 is coupled to the implant 213, and the other end is coupled to the upper part 273.

Figure 11:
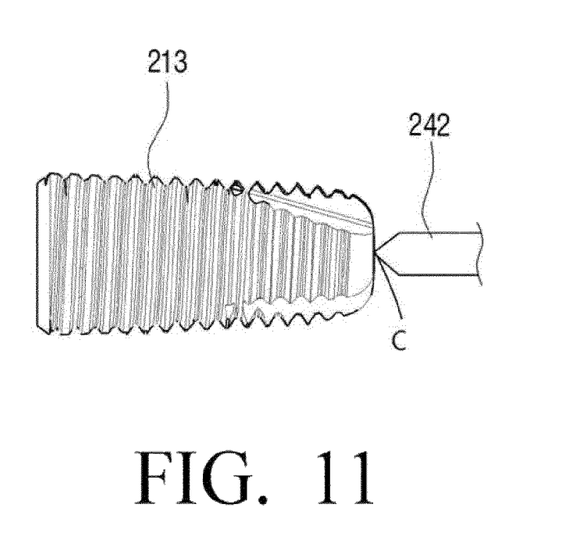

According to an embodiment, the end C of the implant fixing part 276 that is coupled with the implant 213 may have a very small diameter or a diameter which is so small as to be regarded as a point (see FIG. 11). This is to easily decouple the implant 213 from the implant fixing part 276.

According to the present embodiment, the end C of the implant fixing part 276 that is coupled with the implant 213 has a conical shape and a vertex of the cone is coupled with the implant 213.

The other end of the implant fixing part 276 that is coupled with the upper part 273 has a diameter to be inserted into the hole H formed on the upper part 273.

The other end of the implant fixing part 276 that is coupled with the upper part 273 may be fixed and coupled to the hole H, or may be movably coupled to be movable in the hole H.

The dental implant packaging container according to the present embodiment may further include a sealing cap cover 253, and the sealing cap cover 253 may provide a space to have an implant cover screw 255 embedded therein.

The casing 211 and the sealing cap 280 are coupled to each other to form a sealed space.

As described above, the implant 213 and the implant fixing part 275 are coupled to each other in the "breakable coupling" method. As can be seen from FIG. 11, the implant 213 and the implant fixing part 276 may be coupled to each other in the "breakable coupling" method with a contact point C which is as small as possible.

In the present embodiment, the first piece 260 and the second piece 270 are coupled to each other by the "gravitationally separable coupling structure."

For example, the connection part 263 of the first piece 260 has an insertion space S1 to have the lower part 275 of the body part inserted thereinto, and the insertion space S1 may have a shape to have the connection part 263 of the first piece 260 inserted thereinto.

In addition, a diameter d2 of the insertion space S1 is slightly larger than a diameter d1 of a portion into which the body part is inserted (that is, the lower part 275), such that the first piece 260 and the second piece 270 can be decoupled from each other by the gravity.

As described above, the "gravitationally separable coupling structure" refers to a structure by which, when the first piece 260 is positioned higher than the second piece 270 from the ground, the second piece 270 and the first piece 260 are naturally decoupled from each other. This coupling structure can prevent the implant 213 from being contaminated.

In the present embodiment, the casing 211 and the first piece 260 have structures to be easily decoupled from each other when a tape 246 (246a, 246b) is torn. That is, in the same way as in or similarly to the embodiment described above with reference to FIGS. 1 to 4, in which the casing 111 and the sealing cap 180 are easily decoupled from each other, the casing 211 and the first piece 260 have structures to be easily decoupled from each other.

Figure 7:
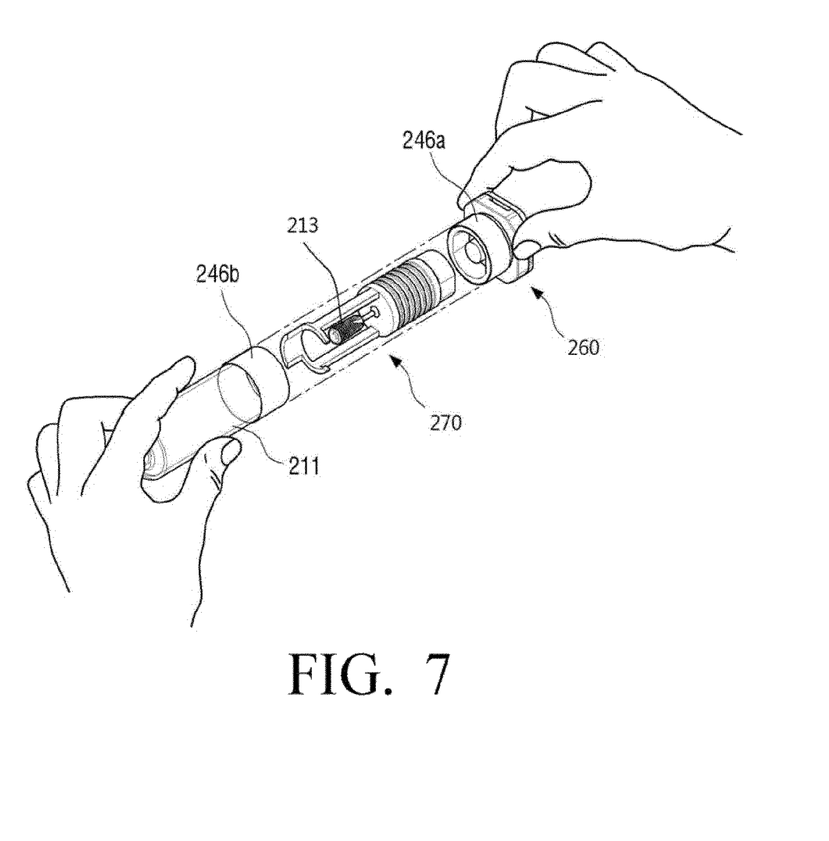
Figure 8:
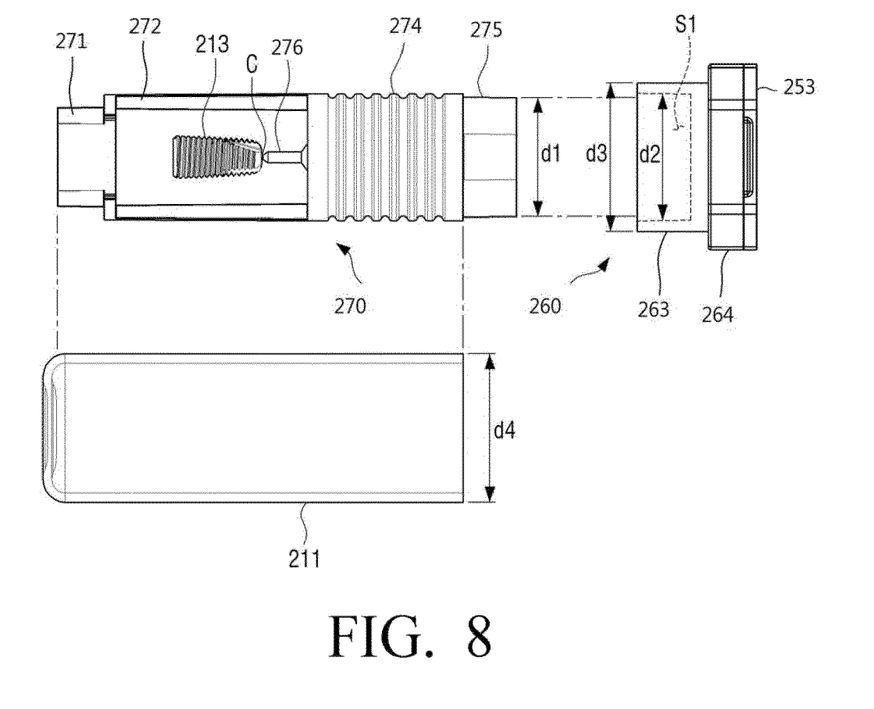

Referring to FIG. 7, an example of the structures of the casing 211 and the first pieces 260 which are easily decoupled from each other will be described. When a user pulls the casing 211 and the first piece 260 away from each other in the state in which the tape 246 (246a, 246b) is torn, the casing 211 and the first piece 260 are easily decoupled from each other.

Although not shown, another example of the structures of the casing 211 and the first piece 260 which are easily decoupled from each other may be structures of the first piece 260 and the casing 211 which are naturally decoupled from each other when the first piece 260 is positioned higher than the casing 211 from the ground in the state in which the tape 246 (246a, 246b) is torn.

A length of a part of the body part 273, 274, 275 (for example, the upper part 273 and the middle part 274), and a length of the guide part 271, 272 may be determined such that the protrusion plate 271 contacts a lower portion of an inside of the casing 211, or is spaced apart therefrom by a minute distance. Herein, the minute distance may be, for example, 5 mm or less.

This is to prevent the second piece 270 from moving inside the casing 211 or to allow only a minute movement even when the second piece 270 moves since the first piece 260 and the second piece 270 are coupled to each other by the "gravitationally separable coupling structure."

Accordingly, the second piece 270 is not allowed to move inside the casing 211 or is allowed to make minute movement before the tape 246 (246a, 246b) is torn.

Figure 9:
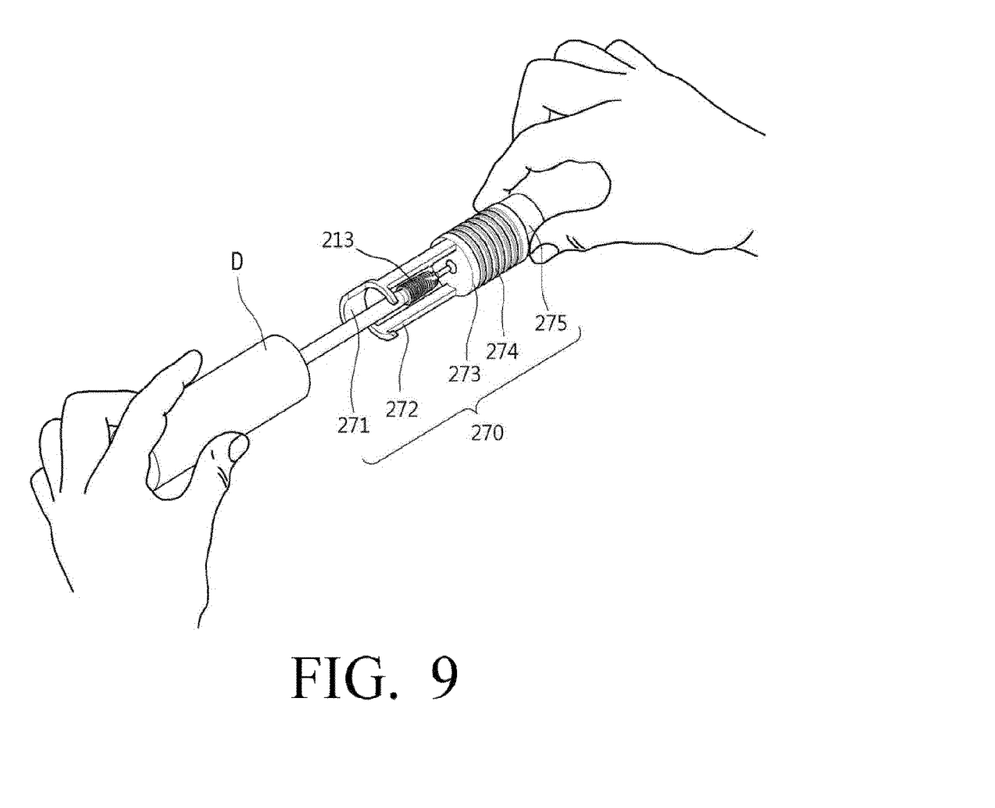
Figure 10:
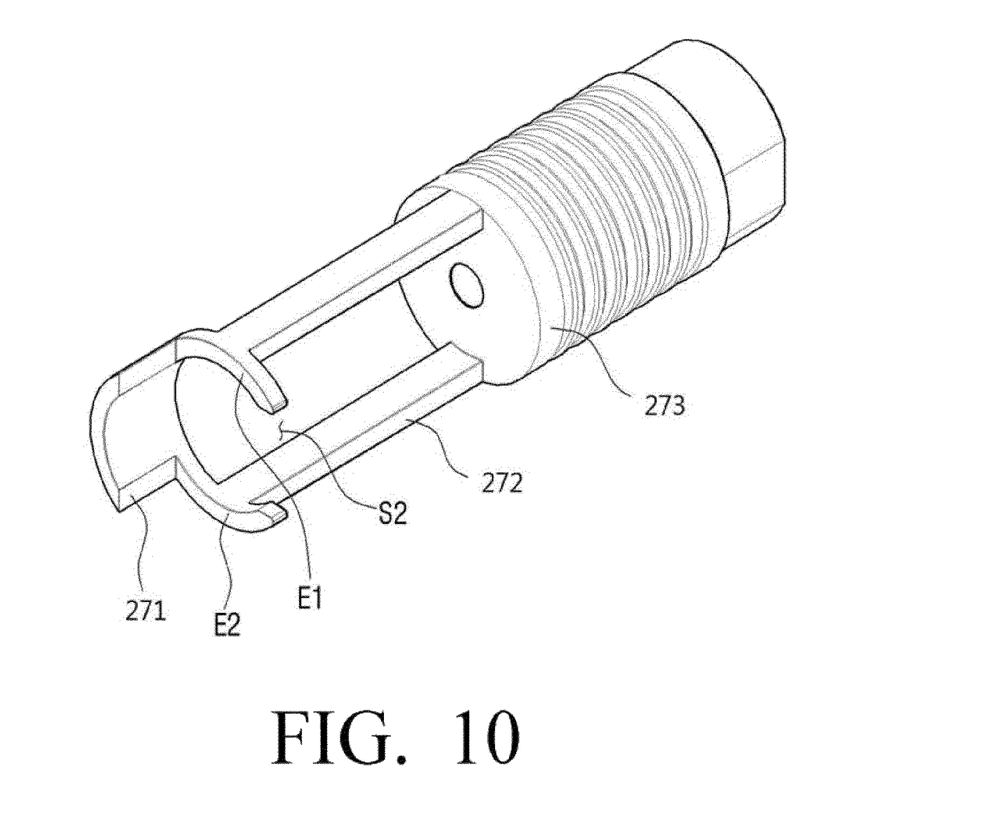

FIG. 9 is a view to explain a method of using the dental implant packaging container according to the embodiment described above with reference to FIGS. 5, 6, 8, 10, and 11.

FIG. 9 may illustrate an operation following the operation illustrated in FIG. 7.

As described above with reference to FIGS. 7 and 8, when the casing 211 and the first piece 260 are decoupled from each other, and the first piece 260 and the second piece 270 are decoupled from each other, the second piece 270 may be placed on a floor or a sterilized fabric.

In this state, a user holds a part of the body part 273, 274, 275 (for example, a part illustrated by reference numeral 274) of the second piece 270 with one hand, and inserts and presses a driver D into the head of the implant 213 with the other hand.

In this case, when the user the user applies a force to the driver D or the body 273, 274, 275 in a certain direction (a direction of making the implant 213 and the implant fixing part 276 easily decoupled), the implant 213 and the implant fixing part 276 are decoupled from each other. Since the implant 213 and the implant fixing part 276 are coupled to each other by "breakable coupling" with a narrow contact point C, the implant 213 and the implant fixing part 276 can be easily decoupled from each other by a small physical external force.

It will be understood by a person skilled in the art to which the present disclosure belongs that various modifications and changes can be made from the detailed descriptions provided above. Therefore, the scope of the present disclosure is not limited to the embodiments described above, and should be defined by the appended claims and equivalents to the claims.

What is claimed is:

1. A dental implant packaging container comprising:
an implant fixing part to which an implant is detachably coupled;
a sealing cap comprising the implant fixing part; and
a casing,
wherein the sealing cap and the casing are coupled to each other to form an inner space,
wherein the casing has a containerlike shape having a hollow formed therein, and has a portion opened,
wherein the opened portion of the casing and the sealing cap are coupled to each other to form the inner space,
wherein the sealing cap comprises two pieces, and the two pieces are a first piece and a second piece which are detachably coupled to each other,
wherein the second piece comprises a guide part and a body part,
wherein the guide part comprises one pair of guide bars surrounding the implant,
wherein the one pair of guide bars are coupled to the body part, respectively, and
wherein the one pair of guide bars are spaced apart from each other, and face each other with the implant being positioned therebetween.

2. The dental implant packaging container of claim 1, wherein an aluminum tape is attached to a portion where the casing and the sealing cap are coupled to each other.

3. The dental implant packaging container of claim 1, wherein the implant fixing part has a conical shape, and the implant is coupled to a vertex of a cone of the conical shape.

4. The dental implant packaging container of claim 1, wherein the implant fixing part has a sticklike shape, one end of a stick of the sticklike shape has a conical shape, and a vertex of a cone of the conical shape is coupled to the implant.

5. The dental implant packaging container of claim 1, wherein the first piece and the second piece are coupled to each other by a gravitationally separable coupling structure,
wherein the gravitationally separable coupling structure is a structure by which, when the first piece is positioned higher than the second piece, the second piece and the first piece are naturally decoupled from each other.

6. The dental implant packaging container of claim 1, wherein one end of the guide part is coupled to an upper part of the body part,
wherein the other end of the guide part is a free end,
wherein the guide part has a structure to surround the implant to prevent the implant from contacting a floor when the second piece is placed on the floor,
wherein the implant fixing part is positioned on the upper part of the body part.

7. The dental implant packaging container of claim 6, wherein the implant fixing part has a conical shape, and the implant is coupled to a vertex of a cone of the conical shape.

8. The dental implant packaging container of claim 6, wherein the implant fixing part has a sticklike shape, one end of a stick of the sticklike shape has a conical shape, and a vertex of a cone of the conical shape is coupled to the implant.

9. The dental implant packaging container of claim 6, wherein the first piece and the second piece are coupled to each other by a gravitationally separable coupling structure.

10. The dental implant packaging container of claim 6, wherein the first piece has an insertion space to allow the body part to be inserted thereinto, and a diameter of the insertion space is larger than a diameter of a portion into which the body part is inserted.

* * * * *